(12) United States Patent
Tokieda

(10) Patent No.: US 9,581,207 B2
(45) Date of Patent: Feb. 28, 2017

(54) TRANSFER MECHANISM STRUCTURE

(71) Applicant: Denki Kogyo Company, Limited, Tokyo (JP)

(72) Inventor: Makoto Tokieda, Tokyo (JP)

(73) Assignee: Denki Kogyo Company, Limited (JP)

( * ) Notice: Subject to any disclaimer, the term of this patent is extended or adjusted under 35 U.S.C. 154(b) by 0 days.

(21) Appl. No.: 14/893,339

(22) PCT Filed: May 28, 2013

(86) PCT No.: PCT/JP2013/064730
§ 371 (c)(1),
(2) Date: Nov. 23, 2015

(87) PCT Pub. No.: WO2014/192074
PCT Pub. Date: Dec. 4, 2014

(65) Prior Publication Data
US 2016/0123406 A1 May 5, 2016

(51) Int. Cl.
*F16D 1/10* (2006.01)
*F16D 11/14* (2006.01)
*F16D 15/00* (2006.01)

(52) U.S. Cl.
CPC .............. *F16D 11/14* (2013.01); *F16D 1/101* (2013.01); *F16D 15/00* (2013.01)

(58) Field of Classification Search
CPC ...................................................... F16D 1/10
See application file for complete search history.

(56) References Cited

U.S. PATENT DOCUMENTS 3,007,652 A * 11/1961 Heckman ............. B65H 75/245
242/571.7
5,213,545 A * 5/1993 Ide ........................... F16D 3/00
464/111

(Continued)

FOREIGN PATENT DOCUMENTS

JP  0742751   2/1995
JP  07278647  10/1995

(Continued)

OTHER PUBLICATIONS

International Search Report for Application No. PCT/JP2013/064730 dated Aug. 20, 2013.

*Primary Examiner* — Derek D Knight
(74) *Attorney, Agent, or Firm* — Lerner, David, Littenberg, Krumholz & Mentlik, LLP

(57) ABSTRACT

A structure of a transfer mechanism is supported by a bearing (15) attached to a disc (10) of a rotary table (1), connects between driven shafts (20) extending in a direction parallel to a rotation shaft (11) and a driving shaft (30) which rotates and drives the rotation shaft (11), and transfers rotation power from the driving shaft (30) to the driven shafts (20). Rollers (31) that turn around a radially extending shaft are arranged at intervals on an outer periphery of one of the driven shafts (20) and the driving shaft (30) in a circumferential direction, and at least one radially extending pins (23) are provided on an outer periphery of the other of the driven shafts (20) and the driving shaft (30), and the pins (23) enter among the rollers (31) arranged adjacent to one another in the circumferential direction in a state in which the driven shafts (20) and the driving shaft (30) are connected.

3 Claims, 3 Drawing Sheets

(56) References Cited

U.S. PATENT DOCUMENTS

| | | | | |
|---|---|---|---|---|
| 6,067,876 | A * | 5/2000 | Lohaus | F16F 15/145 |
| | | | | 74/574.4 |
| 6,109,134 | A * | 8/2000 | Sudau | F16F 15/13157 |
| | | | | 192/207 |
| 6,547,667 | B2 * | 4/2003 | Sugiyama | F16D 3/2055 |
| | | | | 464/111 |
| 2006/0268081 | A1 | 11/2006 | Sugata | |
| 2015/0285311 | A1 * | 10/2015 | Arnold | F16K 31/055 |
| | | | | 403/376 |

FOREIGN PATENT DOCUMENTS

| JP | 2001228748 A | 8/2001 |
|---|---|---|
| JP | 2007010125 A | 1/2007 |
| JP | 2012-031481 A | 2/2012 |

\* cited by examiner

TRANSFER MECHANISM STRUCTURE

CROSS-REFERENCE TO RELATED APPLICATIONS

The present application is a national phase entry under 35 U.S.C. §371 of International Application No. PCT/JP2013/064730 filed May 28, 2013, published in Japanese, the disclosure of which is hereby incorporated herein by reference.

TECHNICAL FIELD

The present invention relates to a structure of a transfer mechanism which transfers rotation power from a driving shaft to driven shafts.

BACKGROUND ART

A workpiece to be thermally treated is often configured so as to turn (autorotate) during a thermal treatment. To turn a workpiece in such a manner, it is necessary to transfer the rotation power to a portion to which the workpiece is to be fixed (workpiece fixing portion). For example, a driving shaft is coupled serially to driven shafts provided to the workpiece fixing portion. Some workpieces are configured so as to turn due to the rotation power transferred from the driving shaft to the driven shaft in the above-described manner.

On the other hand, as a member for conveying a workpiece to be thermally treated, a rotary table is used in some cases (e.g., Patent Literature 1).

A plurality of driven shafts is attached to the table, and workpieces are fixed to the respective driven shafts. The rotary table is turned, the table is stopped at a predetermined position, and the driving shaft is coupled to one driven shaft to turn the workpiece.

CITATION LIST

Patent Literature

[Patent Literature 1] Japanese Patent Application Laid-Open No. 2012-031481

SUMMARY OF INVENTION

Problems to be Solved by the Invention

However, in the configuration mentioned above, when the rotary table is stopped at a predetermined position, for example, it is necessary to adjust the concentricity between the driving shaft and the driven shafts. Furthermore, if a key groove or the like formed on a flange or the like is used for the coupling and fixing between the driving shaft and the driven shafts, it is necessary to adjust the driving shaft and the driven shafts for their locations in the circumferential direction with a high accuracy.

Unless the above-described adjustment is carried out, the ends of the driving shaft and the driven shafts may interfere with one another, which may result in connection failures.

The present invention has been made to solve the above-described problem, and an object of the present invention is to provide a transfer mechanism capable of highly efficiently reaching a state in which rotation power from the driving shaft can be transferred to the driven shafts.

Means for Solving the Problems

In order to achieve the above-described object, according to an aspect of the present invention, a structure of a transfer mechanism that is arranged on a rotary table including a rotation shaft and a disk fixed to the rotation shaft and configured to rotate together with the rotation shaft, and that is configured to transfer rotation power from a driving shaft capable of contacting with and separating from one end of the driven shaft, to a plurality of driven shafts arranged on the disk at intervals in a circumferential direction, and in the structure, the respective driven shafts extend in a direction parallel to the rotation shaft and are turnably supported by a bearing installed on the disk, the driving shaft extends in a direction parallel to the rotation shaft, a plurality of rollers that can turn around a radially extending shaft is arranged at intervals on an outer periphery of one of the driven shaft and the driving shaft in a circumferential direction, at least one radially extending pin is provided on an outer periphery of the other of the driven shaft and the driving shaft, and the pins are configured so as to enter among the rollers arranged adjacent to one another in the circumferential direction in a state in which the driven shaft and the driving shaft are connected.

In addition, in an aspect of the transfer mechanism structure according to the present invention, the rollers are provided to the driving shaft and the pins are provided to the driven shaft.

Furthermore, in an aspect of the transfer mechanism structure according to the present invention, the pins and the rollers are provided in the same number.

Advantageous Effects of Invention

According to the present invention, because the structure of a transfer mechanism that is arranged on a rotary table including a rotation shaft and a disk fixed to the rotation shaft and configured to rotate together with the rotation shaft, and that is configured to transfer rotation power from a driving shaft capable of contacting with and separating from one end of the driven shaft, to a plurality of driven shafts arranged on the disk at intervals in a circumferential direction, and because in the structure, the respective driven shafts extend in a direction parallel to the rotation shaft and are turnably supported by a bearing installed on the disk, the driving shaft extends in a direction parallel to the rotation shaft, a plurality of rollers that can turn around a radially extending shaft is arranged at intervals on an outer periphery of one of the driven shaft and the driving shaft in a circumferential direction, at least one radially extending pins are provided on an outer periphery of the other of the driven shaft and the driving shaft, and the pins are configured so as to enter among the rollers arranged adjacent to one another in the circumferential direction in a state in which the driven shaft and the driving shaft are connected, when the driving shaft comes close to and engages with the driven shafts, the rollers can enter among the pins and engage with the pins. Even if the phase of the rollers and the phase the pins are different from each other, the rollers turn in a state in which the pins and the rollers contact one another, and thereby the pins can be guided so that the pins enter among the rollers. Accordingly, the driving shaft can be connected to the driven shaft, with the motion of the driving shaft for coming close to the driven shaft not being stopped in the middle of the motion.

According to the present invention, because the rollers are provided to the driving shaft and the pins are provided to the driven shafts, the pins having a structure relatively simple compared with that of the rollers can be mounted to a plurality of driven shafts, and thus the structure can be simplified, and furthermore, the number of parts and the like can be reduced.

According to the present invention, because the pins and the rollers are provided in the same number, the power can be securely transferred when the rollers and the pins engage one another.

MODE FOR CARRYING OUT THE INVENTION

Figure 1:
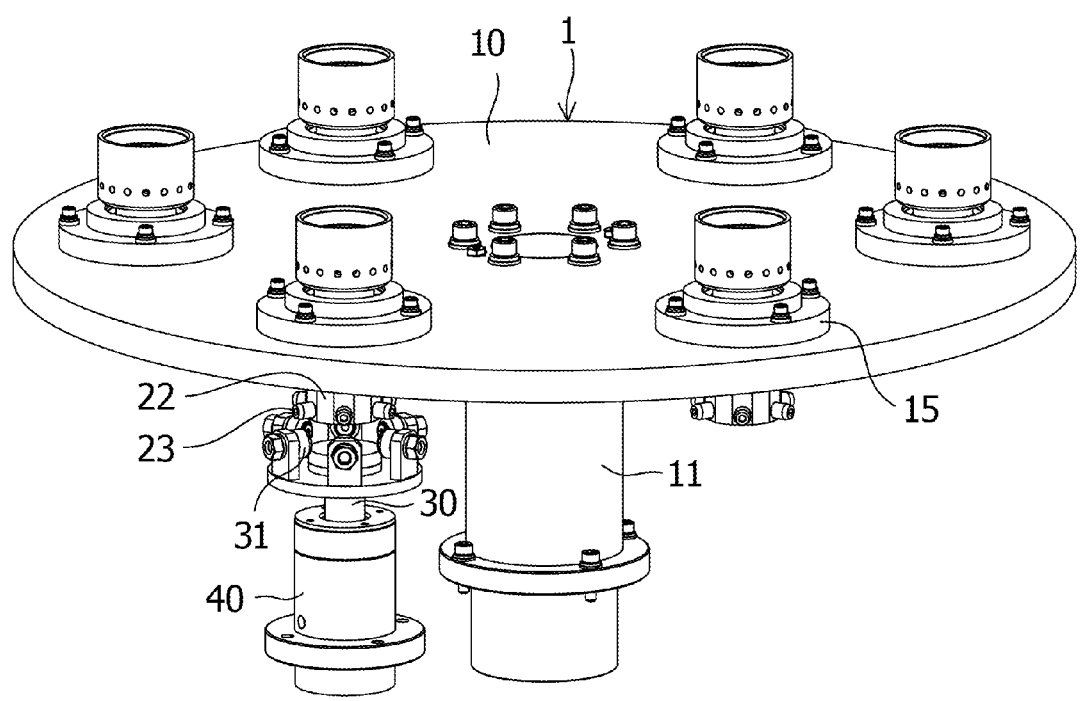
FIG. 1 is a perspective view which illustrates an embodiment of the transfer mechanism according to the present invention in a state in which it is provided to a rotary table device.
Figure 2:
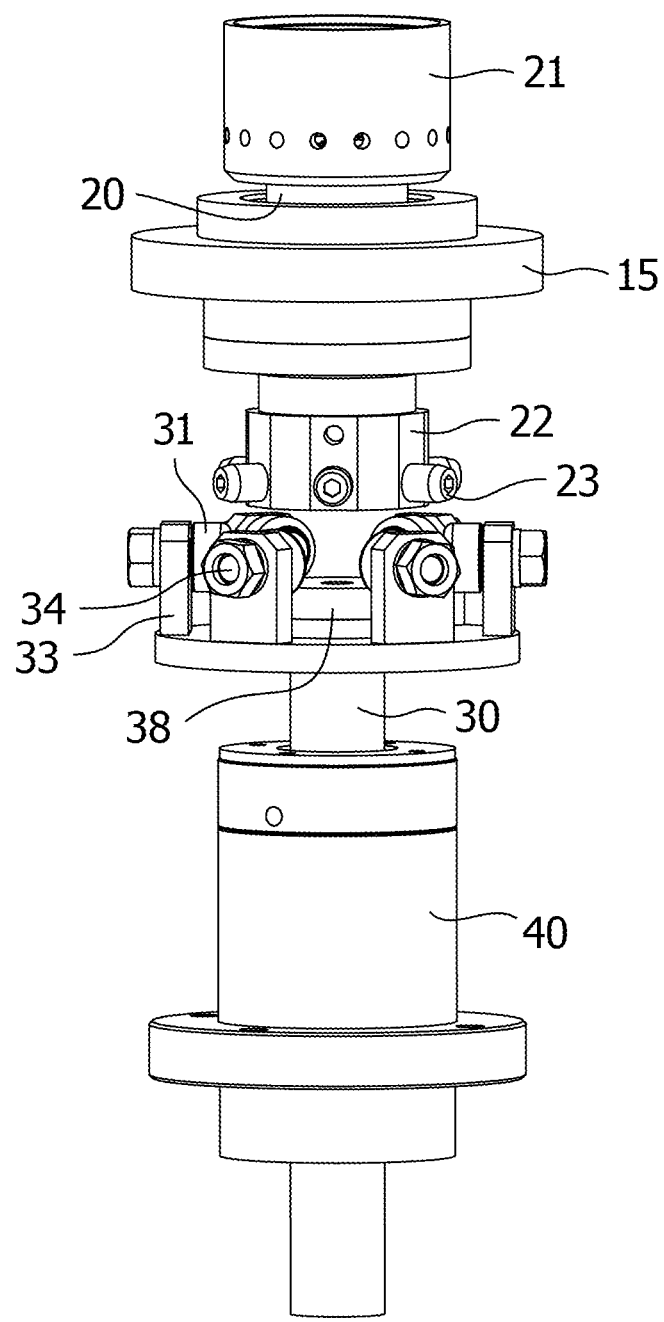
FIG. 2 is a perspective view which illustrates a state before the driving shaft and the driven shaft illustrated in FIG. 1 are connected.
Figure 3:
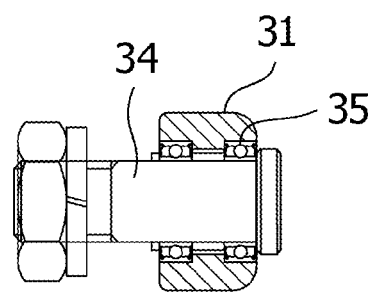
FIG. 3 is a front view which illustrates a partial section of a transfer roller and the like of the transfer mechanism illustrated in FIG. 1.
Figure 4:
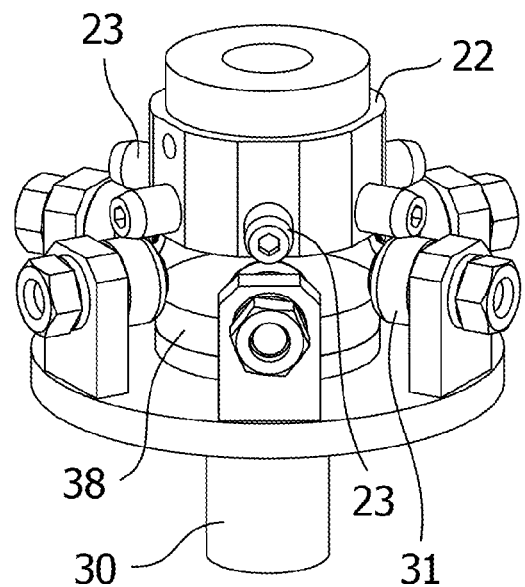
FIG. 4 is a partial perspective view which illustrates a part of the transfer mechanism illustrated in FIG. 1, which shows an example of the state before the driven shaft and the driving shafts are connected.
Figure 5:
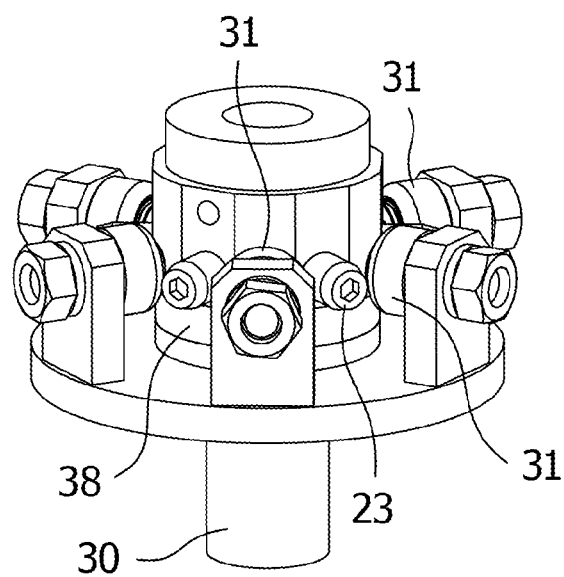
FIG. 5 is a partial perspective view which illustrates a state in which the driven shaft and the driving shaft illustrated in FIG. 4 are connected.

An embodiment of the transfer mechanism structure according to the present invention will be described below with reference to the attached drawings (FIGS. 1 to 5). FIG. 1 is a perspective view which illustrates a state in which the transfer mechanism according to the present embodiment is provided to a rotary table device 1. FIG. 2 is a perspective view which illustrates a state before driven shafts 20 and a driving shaft 30 illustrated in FIG. 1 are connected. FIG. 3 is a front view which illustrates a partial section of a transfer roller 31 and the like of the transfer mechanism illustrated in FIG. 1. FIG. 4 is a partial perspective view which illustrates a part of the transfer mechanism illustrated in FIG. 1, which shows an example of the state before the driven shaft 20 and the driving shaft 30 are connected. FIG. 5 is a partial perspective view which illustrates a state in which the driven shaft 20 and the driving shaft 30 illustrated in FIG. 4 are connected.

The transfer mechanism according to the present embodiment is provided to the rotary table device 1. The rotary table device 1 is a device for conveying a workpiece to be thermally treated in a circumferential direction. The transfer mechanism in this example is a mechanism that transfers and cuts off rotation power to upper bearings 15, which are attached at a plurality of locations in a circumferential direction on the rotary table device 1. The rotary table device 1 and the transfer mechanism installed to the rotary table device 1 will be described below.

Referring to FIG. 1, the rotary table device 1 includes a rotation shaft 11 and a disk-like table 10. The rotation shaft 11 is a vertically extending columnar member coupled to a motor (not illustrated). The rotation shaft 11 is configured so that it turns in accordance with driving by the motor.

The table 10 is fixed to the rotation shaft 11. The table 10 turns as the rotation shaft 11 rotates. In this turning motion, the table 10 turns coaxially with the rotation shaft 11. Six driven shafts 20 are attached to the table 10. Configurations of the driven shaft 20 and the like will be described below.

The transfer mechanism is a mechanism in which rotation power from the driving shaft 30 is transferred to the driven shaft 20 in a state in which the driven shaft 20 and the driving shaft 30 are connected, and includes rotation transfer pins 23 provided to the driven shaft 20 and rotation transfer rollers 31 provided to the driving shaft 30.

The driven shafts 20 extend in directions parallel to the rotation shaft 11 and are turnably supported by the six upper bearings 15 fixed to the table 10. The driven shafts 20 are arranged so as to penetrate through the table 10, and a mount 21 is provided to the driven shaft 20 on the upper surface side of the table 10. The mount 21 is a mount for installing the workpiece to be thermally treated.

A receiving block 22 is attached on a lower end of the driven shaft 20 arranged on the side of the lower surface of the table 10. Six rotation transfer pins 23 are provided on an outer side of the receiving block 22 in a radial direction. The six rotation transfer pins 23 installed to the respective driven shafts 20 extend radially in relation to the axial direction of the driven shafts 20 and are circumferentially arranged at equal intervals.

The receiving block 22 penetrates through the table 10 in the vertical direction, and an upper end of the driving shaft 30 can be inserted through an opening on the lower side. The driven shaft 20 is configured so as to have a hollow cylindrical shape and so that liquid flows through the inside thereof. More specifically, the liquid that flows through Therefore inside of the receiving block 22 flows into the inside of the driven shaft 20. This liquid is used for cooling the bottom surface of the workpiece by water cooling, for example, during thermal treatment.

The driving shaft 30 is arranged below the table 10 and extends in a direction parallel to the rotation shaft 11. The driving shaft 30 is turnably supported by a lower bearing 40, which is arranged below the table 10 and installed to a frame (not illustrated). The driving shaft 30 is configured so as to have a hollow cylindrical shape and so that liquid flows in its inside.

The upper end of the driving shaft 30 is configured to be connected to the lower end of the driven shaft 20. In this example, although not illustrated in detail in the drawing, the upper end of the driving shaft 30 is inserted into the opening of the receiving block 22 of the driven shaft 20. The driving shaft 30 and the driven shafts 20 are configured so that the liquid flows from the inside of the driving shaft 30 into the inside of the driven shaft 20 in a state in which the driving shaft 30 and the driven shaft 20 are connected. A gasket 38 for preventing the liquid from leaking is arranged on the upper end of the driving shaft 30.

A setting is set so that a distance from the axial center of the rotation shaft 11 to the driving shaft 30 in the radial direction becomes the same as a distance from the axial center of the rotation shaft 11 to the driven shaft 20 in the radial direction. As the table 10 of the rotary table device 1 turns, one of the six driven shafts 20 is overlapped with the driving shaft 30 at a predetermined location in the circumferential direction.

A roller clamping plate 32 and a roller support member 33 are attached to the driving shaft 30. The roller clamping plate 32 is a perforated disk configured so as to surround the driving shaft 30 from an outside thereof in the radial direction. Six roller support members 33 are fixed on the upper surface of the disk surface of the roller clamping plate 32. The roller support members 33 are a member extending from the upper surface in the perpendicular direction and arranged in the circumferential direction at equal intervals.

To the roller support member 33, roller shafts 34, which are a member for supporting the transfer roller 31 (i.e., bolts in this example), are mounted (FIG. 3). The roller shafts 34 extend from the axial center of the driving shaft 30 in the radial direction. To the roller shaft 34, the rotation transfer roller 31 is turnably mounted via a roller bearing 35. The rotation transfer rollers 31 attached to the roller shaft 34 are arranged so as to bear a clearance against the upper surface of the roller clamping plate 32.

The driving shaft 30 is connected to a rotary actuator (not illustrated) for autorotation thereof. When the driving shaft 30 is in connection with the driven shaft 20, the driven shafts 20 rotate in interlock with the driving shaft 30 via the transfer mechanism. More specifically, the rotation power from the driving shaft 30 is transferred to the driven shaft 20. The transfer of the rotation power will be described below.

The driving shaft 30 is connected also to an elevating actuator (not illustrated) for moving in the vertical direction. Accordingly, when the driving shaft 30 moves upward, the driving shaft 30 comes close to the table 10 to be connected to the driven shafts 20. On the other hand, when the driving shaft 30 moves downward, the driving shaft 30 is separated from the driven shafts 20.

Now, an operation for connection between the driven shafts 20 and the driving shaft 30 will be described below. First, the table 10 of the rotary table device 1 is turned. After that, the table 10 is stopped so that the location of the driven shaft 20, to which the workpiece to be thermally treated has been attached, in the circumferential direction is on a line extended from the upper part of the driving shaft 30.

Next, the elevating actuator (not illustrated) lifts the driving shaft 30. When the rotation transfer pins 23 of the driven shaft 20 are positioned among the rotation transfer rollers 31 of the driving shaft 30, the driving shaft 30 is ascended without stopping, and the upper end of the driving shaft 30 is inserted into the opening of the receiving block 22 of the driven shaft 20. The ascending motion of the driving shaft 30 is stopped there. At this timing, the rotation transfer pins 23 enter among the transfer rollers 31 adjacent to one another in the circumferential direction.

Subsequently, the driving shaft 30 is turned by the rotary actuator. At this timing, the rotation transfer rollers 31 and the rotation transfer pins 23 engage, the rotation power from the driving shaft 30 is transferred to the driven shaft 20, and thereby the driven shafts 20 turns. As described above, the operation by the transfer mechanism for transferring the rotation power is completed.

Next, an operation performed in a case in which a difference of phases between the rotation transfer rollers 31 and the rotation transfer pins 23 exists in the course of the ascending motion of the driving shaft 30, i.e., an operation performed in a case in which the rotation transfer pins 23 contacts the outer peripheral surface of the rotation transfer rollers 31 on the upper side thereof (FIG. 4), will be described.

A setting has been performed so that the ascending motion of the driving shaft 30 is continued after the rotation transfer pins 23 have contacted the rotation transfer rollers 31. Accordingly, a force (impact) from the rotation transfer rollers 31 for pushing up the rotation transfer pins 23 acts on them. At the time of the contact, it is possible that a great impact may act among the rotation transfer pins 23 and the rotation transfer rollers 31.

However, because the rotation transfer rollers 31 are rotatable, the rotation transfer rollers 31 rotate due to their contact with the rotation transfer pins 23. This impact is turned aside by the rotation of the rotation transfer rollers 31. The driven shafts 20 is in a rotatable state, and the rotation transfer pins 23 can slidingly move on the circumferential surface of the rotation transfer rollers 31. More specifically, the rotation transfer pins 23 are urged by the rotation of the rotation transfer rollers 31 to move slidingly, and as a result, the driven shaft 20 turns.

Furthermore, when the driving shaft 30 is lifted, the rotation transfer rollers 31 and the rotation transfer pins 23 engage. More specifically, the rotation transfer pins 23 can enter among the rotation transfer rollers 31 arranged adjacent to one another in the circumferential direction. Subsequently, as the driving shaft 30 further ascends, the upper end of the driving shaft 30 is inserted into the receiving block 22 of the driven shaft 20. At this timing, the ascending motion of the driving shaft 30 stops. As described above, the operation of the transfer mechanism for transferring the rotation power is completed.

With the above-described configuration, in the transfer mechanism, when the driving shaft 30 comes close to and contacts with the driven shaft 20, the rotation transfer rollers 31 enter among and engage with the rotation transfer pins 23. Even if the phase of the rotation transfer rollers 31 and the phase of the rotation transfer pins 23 are different, the rotation transfer rollers 31 rotates in the state in which the rotation transfer pins 23 and the rotation transfer rollers 31 are in contact with one another, and thereby the rotation transfer pins 23 can be guided so that they enter among the rotation transfer rollers 31. As a result, it becomes unnecessary to adjust the locations of the driving shaft 30 and the driven shaft 20 in the circumferential direction with a high accuracy.

Because the rotation power can be transferred if the rotation transfer pins 23 can enter among the rotation transfer rollers 31 arranged adjacent to one another in the circumferential direction, it becomes unnecessary to strictly adjust the concentricity between the driven shafts 20 and the driving shaft 30, and thus, it becomes relatively easy to perform the adjustment.

In addition, the driving shaft 30 can be descended when the driven shaft 20 and the driving shaft 30 have been connected and the rotation power has been transferred. In this case, the rotation transfer pins 23 move along the circumferential surface of the rotating rotation transfer rollers 31, and thereby the driving shaft 30 can be descended with a smooth motion. More specifically, the timing of descending the driving shaft 30 can be freely set.

Accordingly, it becomes possible for the driving shaft 30 to be coupled to the driven shafts 20 without discontinuation of the motion (i.e., ascending motion) of the driving shaft 30 for approaching the driven shafts 20, and as a result, the connection between the driven shafts 20 and the driving shaft 30 can be efficiently performed.

Furthermore, in this example, because the rotation transfer rollers 31 are provided to the driving shaft 30 and the rotation transfer pins 23 are provided to the driven shaft 20, the rotation transfer pins 23 with a structure that is relatively simple compared with the structure of the rotation transfer rollers 31 can be attached to the driven shaft 20. Accordingly, the structure can be simplified, and furthermore, the number of parts, etc. can be reduced. Furthermore, because the rotation transfer pins 23 and the rotation transfer rollers 31 are provided in the same number, the power can be securely transferred when the rotation transfer rollers 31 and the rotation transfer pins 23 are engaged.

As can be understood from the above description, according to the present embodiment, it is possible to efficiently perform the process for reaching a state in which the rotation power from the driving shaft 30 can be transferred to the driven shaft 20 attached to the table 10 of the rotary table device 1.

The description of the above-described embodiment is merely an example given to describe the present invention, and does not limit the invention as claimed in the claims. In addition, the configurations of the present invention are not limited to those in the above-described embodiment and can be implemented by various modifications and alterations within the technical scope of the claims.

In the above-described embodiment, the rotation transfer pins 23 and the rotation transfer rollers 31 are provided in the same number; however, the number thereof is not limited to this. The number of the rotation transfer pins 23 may be fewer than the number of the rotation transfer rollers 31, or in an alternative configuration, the number of the rotation transfer pins 23 may be one. In the above-described embodiment, the rotation transfer pins 23 are provided to the driven shaft 20 and the rotation transfer rollers 31 are provided to the driving shaft 30. However, the present invention is not limited to this. Alternatively, the rotation transfer rollers 31 may be attached to the driven shaft 20 and the rotation transfer pins 23 may be fixed to the driving shaft 30.

In the above-described embodiment, six of the rotation transfer rollers 31 are arranged; however, the present invention is not limited to this. The number of the rotation transfer rollers 31 may be more than or fewer than six, which may be set in accordance with the dimensions and the like of the driven shaft 20.

In the above-described embodiment, the rotary table device 1 includes the rotation shaft 11 that extends in the perpendicular direction. However, the present invention is not limited to this. The transfer mechanism according to the above-described embodiment can be used in an apparatus in which the rotation shaft 11 is horizontally arranged.

REFERENCE SYMBOLS LIST

1 Rotary table device
10 Table
11 Rotation shaft
15 Upper bearing
20 Driven shaft
21 Mount
22 Receiving block
23 Rotation transfer pin
30 Driving shaft
31 Rotation transfer roller
32 Roller clamping plate
33 Roller support member
34 Roller shaft
35 Roller Bearing
38 Gasket
40 Lower bearing

The invention claimed is:

1. A structure of a transfer mechanism that is arranged on a rotary table including a rotation shaft and a disk fixed to the rotation shaft and configured to rotate together with the rotation shaft, and that is configured to transfer rotation power from a driving shaft capable of contacting with and separating from one end of the driven shaft, to a plurality of driven shafts arranged on the disk at intervals in a circumferential direction,
  wherein the respective driven shafts extend in a direction parallel to the rotation shaft and are turnably supported by a bearing installed on the disk,
  the driving shaft extends in a direction parallel to the rotation shaft,
  a plurality of rollers that can turn around a radially extending shaft is arranged at intervals on an outer periphery of one of the driven shaft and the driving shaft in a circumferential direction,
  at least one radially extending pin is provided on an outer periphery of the other of the driven shaft and the driving shaft, and
  the pins are configured so as to enter among the rollers arranged adjacent to one another in the circumferential direction in a state in which the driven shaft and the driving shaft are connected.

2. The transfer mechanism structure according to claim 1, wherein the rollers are provided to the driving shaft and the pins are provided to the driven shaft.

3. The transfer mechanism structure according to claim 1, wherein the pins and the rollers are provided in the same number.

* * * * *